(12) United States Patent  (10) Patent No.: US 6,748,415 B1
Sugimoto  (45) Date of Patent: Jun. 8, 2004

(54) PICTURE PRINT PLAYING APPARATUS CAPABLE OF REPLACING A FRAME PICTURE ACCORDING TO A SET PERIOD

(75) Inventor: Hideki Sugimoto, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/383,668

(22) Filed: Aug. 26, 1999

(30) Foreign Application Priority Data

Aug. 27, 1998 (JP) .......................................... P10-242249

(51) Int. Cl.$^7$ .............................................. G06F 15/16
(52) U.S. Cl. ..................... 709/201; 709/248; 40/124.01
(58) Field of Search ............................... 709/201, 203, 709/204, 205, 248; 276/295; 382/154; 40/124.01

(56) References Cited

U.S. PATENT DOCUMENTS

| | | | | |
|---|---|---|---|---|
| 5,537,155 A | * | 7/1996 | O'Connell et al. | ......... 348/699 |
| 6,016,183 A | * | 1/2000 | Yamamoto | ................... 352/100 |
| 6,178,258 B1 | * | 1/2001 | Sugimoto | ................... 382/154 |
| 6,233,603 B1 | * | 5/2001 | Matsuhashi et al. | ........ 709/203 |
| 6,636,565 B1 | * | 10/2003 | Kim | ....................... 375/240.27 |

FOREIGN PATENT DOCUMENTS

| | | |
|---|---|---|
| JP | 6-15382 | 2/1994 |
| JP | 3044500 | 10/1997 |

\* cited by examiner

Primary Examiner—Zarni Maung
(74) Attorney, Agent, or Firm—Jordan and Hamburg LLP

(57) ABSTRACT

A picture print playing apparatus has a hard disk which contains a period-setting file in which a display-start date of a period-limited frame picture on a screen is stored. When the display-start date agrees with the present date, a frame picture which has already been displayed on a CRT, is replaced by the period-limited frame picture. Thereby, if the same display-start date and time are set in all of the picture print playing apparatuses, the period-limited frame pictures are simultaneously replaced at the same time in plural apparatuses at the same time.

10 Claims, 6 Drawing Sheets

PICTURE PRINT PLAYING APPARATUS CAPABLE OF REPLACING A FRAME PICTURE ACCORDING TO A SET PERIOD

This application is based on Patent Application No. 10-242249 filed in Japan, the contents of which are hereby incorporated by reference.

BACKGROUND OF THE INVENTION

This invention relates generally to a picture print playing apparatus having a function for superimposing a user's subject picture on an elected frame picture so as to produce a self-portrait, and providing a sticker sheet onto which the self-portrait is printed to the user.

Conventionally, there has been known a picture print playing apparatus, which superimposes a user's desired subject picture taken by a camera on previously prepared frame picture data as a background picture so as to produce a self-portrait and display it on a CRT (cathode ray tube), and prints the self-portrait onto a sticker sheet using a video printer (e.g., publication of Japanese laid-open utility model application No. 6-15382).

In the above-mentioned picture print playing apparatus, variously designed frames are previously prepared for using them as a background picture of the self-portrait. It has been known that the frequency of usage of the picture print playing apparatus greatly depends on types, designs and the like of frame pictures which are stored in the apparatus. Accordingly, if the apparatus always displays the same picture frames which were previously set for the long time, users will become tired of them. To solve this problem, a picture print playing apparatus has been provided wherein a management person can arbitrarily renew the frame picture data (e.g., official gazette of Japanese utility model No. 3044500).

However, if a plurality of the above-described picture print playing apparatuses are placed at many regions, maintenance personnel has to bring a disk or the like containing frame picture data and replace the frame picture data in order to always display frame picture data having distinctive features according to seasons and regions. This reduces productivity, and causes a problem of increasing costs. Further, the above-described picture print playing apparatus may use frame pictures of a period-limited type in which a playing period is limited according to each of campaigns and the like, but in the above-mentioned conventional method for replacing the frame picture data, it is difficult to simultaneously carry out the replacement in all of the playing apparatuses. As a result, it has been impossible to unify the playing period for all of the apparatuses.

Moreover, it has been known that a picture print playing apparatus is connected to a host computer for downloading frame picture data from said host computer, thereby, timely replacing frame picture data. However, in this replacing method, it is also difficult to transmit frame picture data simultaneously to a plurality of playing apparatuses, so that it has been impossible to unify the playing period of the frame pictures for all of the apparatuses. Further, the apparatus requires a special program in order to download the renewal frame picture data so as to replace the frame pictures. While said program is operated, users cannot use the apparatus for printing a photograph on stickers. Consequently, if a picture print playing apparatus is placed in a busy street, and incessantly used by users one after another all the time from the start-up in the morning until the operation is stopped in the night, there occurs no time for replacing the frame picture data, which causes a delay in downloading the frame picture data between said apparatus and other apparatuses, and the playing period of the period-limited frame pictures considerably differs in each of apparatuses.

SUMMARY OF THE INVENTION

This invention is made to solve the above-mentioned problems. One object of the present invention is to provide a picture print playing apparatus wherein frame pictures of a period-limited type are simultaneously replaced in plural apparatuses with ease.

In order to achieve the above-mentioned objects, according to one aspect of the present invention, in a picture print playing apparatus having a function for superimposing a user's subject picture on an elected frame picture so as to produce a self-portrait, and providing a sticker onto which the self-portrait is printed to the user, when the present date and time agree with a display-start date and time of frame picture data stored in a memory, said frame picture replaces a frame picture which has already been displayed on a screen, and said new frame picture is automatically displayed so as to be used for playing. Therefore, if the same display-start time and date are set in all of the playing apparatuses, frame pictures can be simultaneously replaced at the same time in the playing apparatuses. This eliminates a necessity of simultaneously replacing the frame pictures on the display-start date and time by plural maintenance personnel, and a necessity of simultaneously transmitting frame picture data to a plurality of apparatuses which are connected to a host computer through a communication line. Thereby, the present invention makes it possible to unify the date and time of replacing the frame pictures for a plurality of playing apparatuses with using a simple constitution.

DETAILED DESCRIPTION OF THE PREFERRED EMBODIMENT OF THE PRESENT INVENTION

Figure 1:
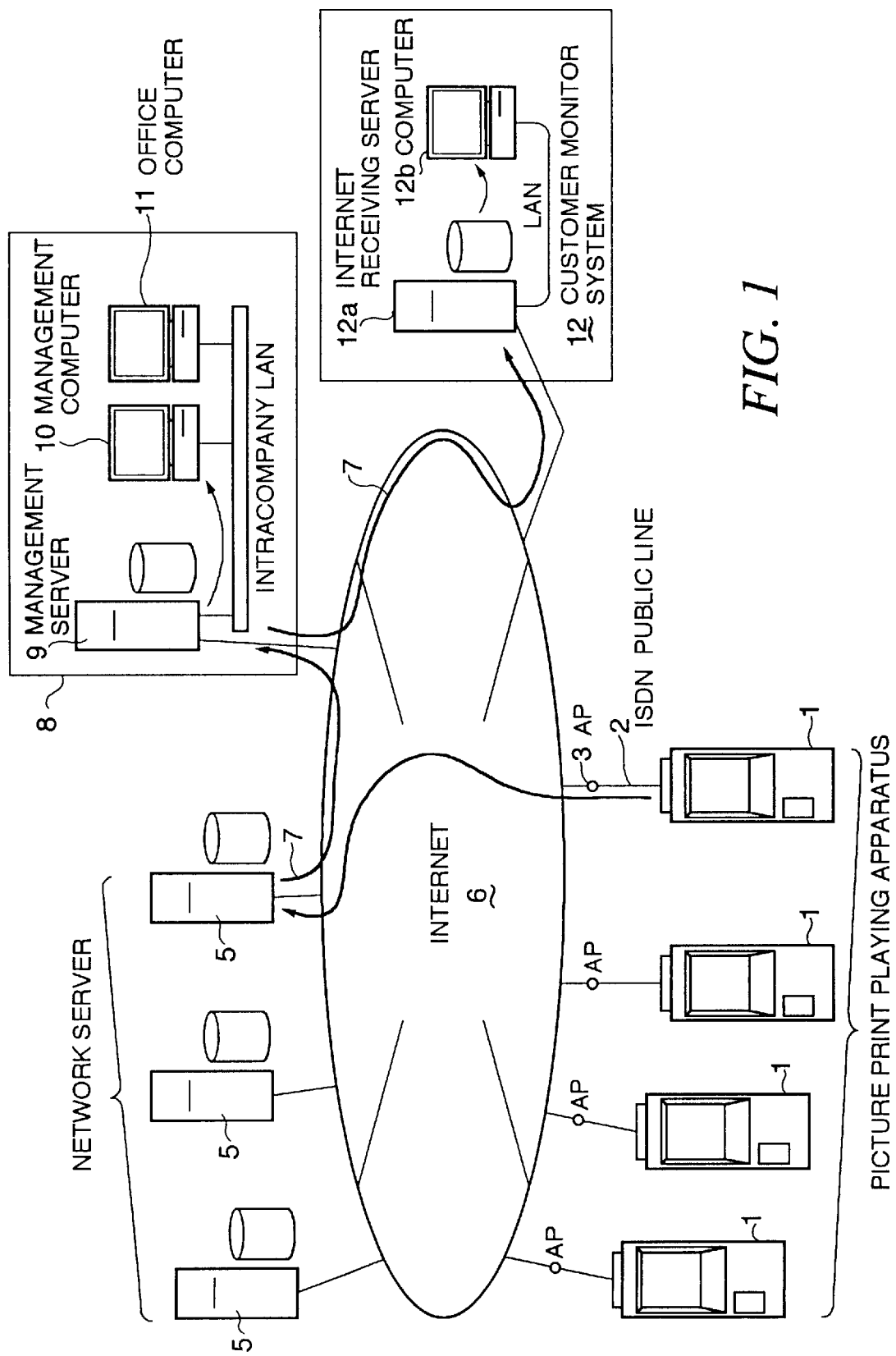
FIG. 1 is a constitutional view showing a whole system of a picture print playing apparatus according to one embodiment of the present invention.

Now, one embodiment of the present invention will be explained with reference to the drawings. FIG. 1 is a constitutional view showing a whole system of a picture print playing apparatus 1 of the present invention. The picture print playing apparatus 1, which is operated by depositing of coins, has a playing function for superimposing a user's subject picture on an elected frame picture so as to produce a self-portrait, and providing a sticker onto which the self-portrait is printed to the user, and it also has a playing function for producing and recording a homepage based on data including said self-portrait, and printing out said home page onto a sticker. In the present embodiment, the former playing function is referred to as "stand-alone type playing", and the later is referred to as "network type playing". The picture print playing apparatus 1 can be connected to internet 6 through access point (AP) 3 from digital public phone line (ISDN: integrated services digital network) 2. A network server 5 for exhibiting the home page is connected to the internet 6.

A management server 9 and a management computer 10 which act as a management apparatus 8 of the system of the present invention are connected to the internet 6 through a private line 7, and an office computer 11 is connected to the management apparatus 8 via intracompany LAN (local area network). The picture print playing apparatus 1 transmits picture data, voice data and text data (hereinafter these data are generally called "self-portrait data") together with management data to the management server 9 and office computer 11 via the ISDN 2. The management computer 10 manages proceeds, a number of times of usage, operations, a number of times of frame usage, an amount of money in the system, and the like. The office computer 11 manages money collection, billing and the like. The management apparatus 8 is also connected to a customer-monitor system 12. The customer-monitor system 12 includes an internet receiving server 12a and a monitoring computer 12b which are connected with each other by LAN, and it indicates the running-out of sticker sheets in the apparatus 1, and also indicates various operations.

Figure 2:
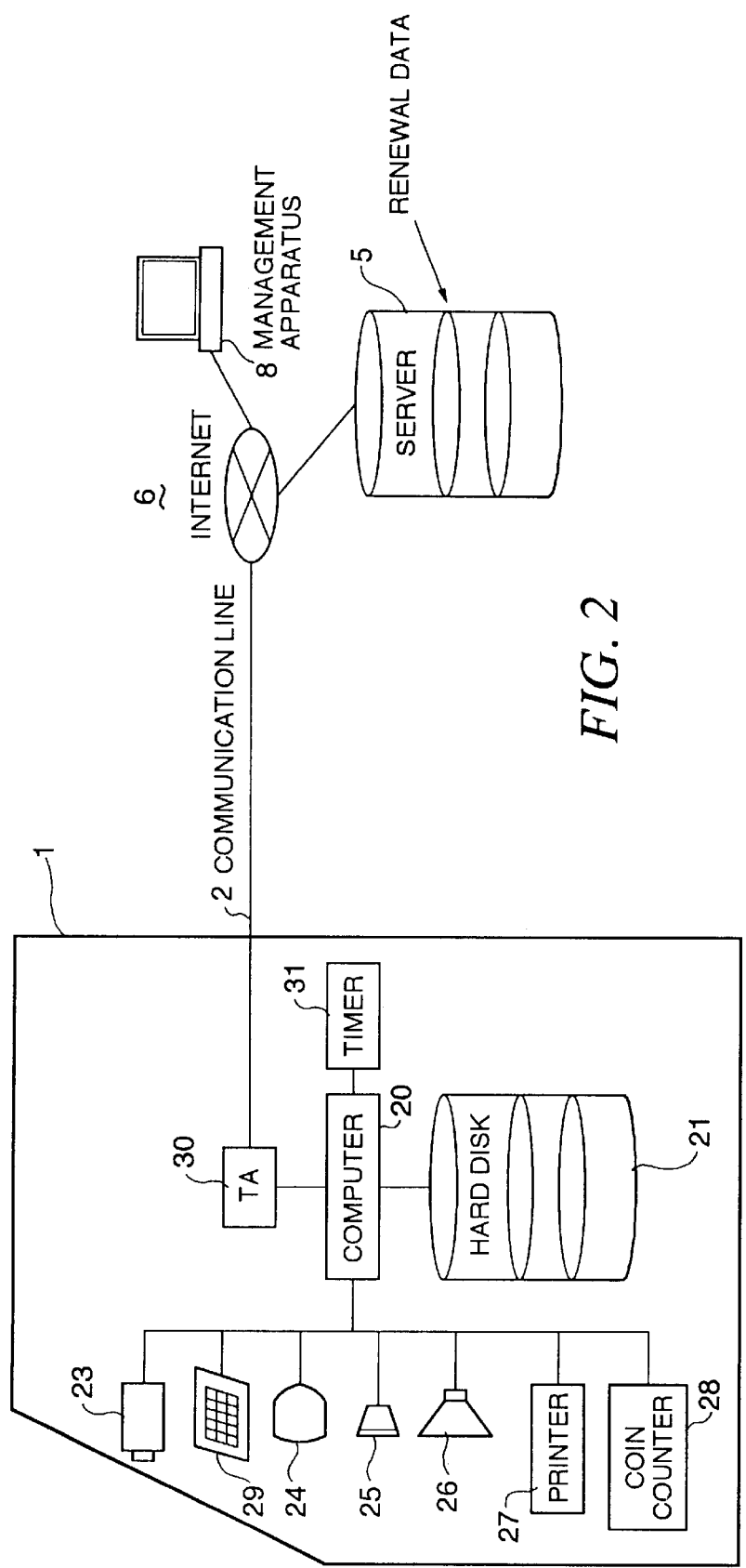
FIG. 2 is a block diagram showing a periphery constitution of the picture print playing apparatus according to one embodiment of the present invention.

FIG. 2 is a block diagram showing a detail constitution of the periphery of the picture print playing apparatus 1. The picture print playing apparatus 1 comprises a computer 20 (processor) for controlling the playing functions. The computer 20 contains a hard disk 21 (memory) for storing files of control programs and plural kinds of frame picture data as a background of the self-portrait. The computer 20 is connected to a camera 23 for imaging a subject picture desired by the user, a CRT (cathode ray tube) 24 for displaying a self-portrait obtained by superimposing an elected frame picture data and inputted text data on the imaged subject picture, and a microphone 25 for receiving voice. Further, the computer 20 is connected to a speaker 26 for outputting the voice, a printer 27 for color printing the self-portrait onto a sticker sheet, a coin counter 28 for discriminating coins deposited by the user and counting an amount of the coins, an operation key 29 by which the user inputs text information, and elects frame pictures, and a timer 31 for measuring a present date and time. The data such as text and the like, and command signals can be inputted by a touch panel on the CRT 24, instead of the operation key 29.

The computer 20 has the function of the stand-alone type playing for printing the subject picture onto a sticker sheet, and the function of the network type playing for producing and exhibiting the homepage in internet, and printing the homepage onto a sticker sheet. The above-mentioned camera 23, CRT 24, printer 27 and the like are used in both of these functions. The picture to be printed on the sticker sheet is produced based on a subject picture (usually front upper-body picture of the user) imaged by a camera 23, frame picture data elected through the operation key 29 by the user, and inputted text data, and then, the self-portrait data is produced by inputting voice data through the microphone 25. The produced self-portrait data is transmitted to the network server 5 through terminal adapter (TA) 30, communication line 2 including the digital phone line, and internet 6. Thus, the self-portrait data for homepage is produced. The printer 27 makes printed output of the produced self-portrait for a sticker or homepage onto a sticker sheet.

Figure 3:
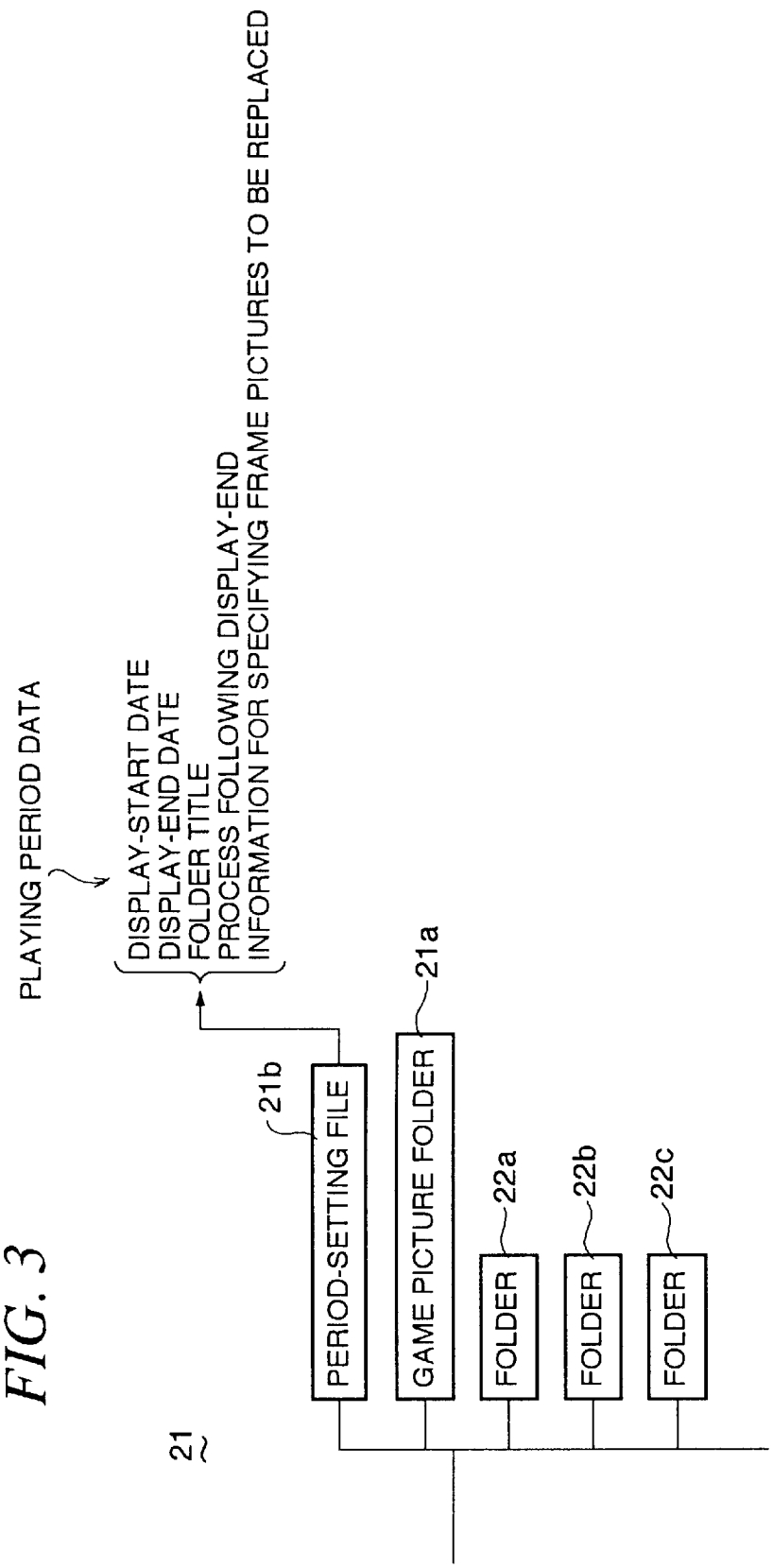
FIG. 3 is a view showing a hierarchy of data in a hard disk of the picture print playing apparatus according to one embodiment of the present invention.
Figure 6:
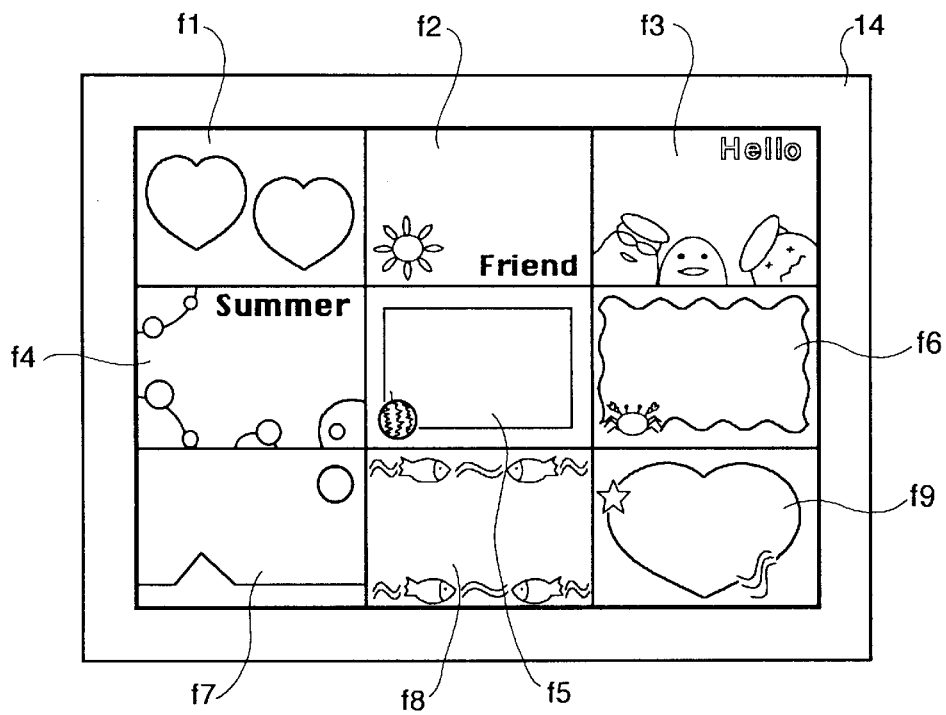
FIG. 6 is a view showing an arrangement of frame pictures displayed on a CRT (cathode ray tube).

FIG. 3 is a view showing a data hierarchy in the hard disk 21. The hard disk 21 contains a game picture folder 21a for storing a plurality of frame picture data, and displays the frame picture data which is extracted in the game picture folder onto the CRT 24 as shown in FIG. 6. Also, the hard disk 21 has folders 22a, 22b and 22c for storing frame picture data which are not yet displayed on the CRT 24, and has a period-setting file 21b for storing the playing period data consisting of start date and end date (date and time) of displaying these frame pictures on the CRT 24, information for specifying frame pictures to be replaced, a method of processing the frame picture data after the elapse of the playing period, and the like.

Next, the explanation is given to an operation of network type playing by the system of the above-described picture print playing apparatus 1, and especially to an operation for transmitting frame picture data to the picture print playing apparatus 1. As to general usage of the picture print playing apparatus 1, a management personnel turns on the power of the apparatus 1 when a game center is opened in the morning. When the game center is just opened in the morning, there may be few customers, so that, if another program for rewriting data is started, the program is considered to be an initial operation. At that time, the later-described various data is transmitted from the server to the apparatus 1, or from the apparatus 1 to the server.

The contents of the data to be transmitted are: (1) new frame picture data and playing period data of said frame picture . . . from server to apparatus 1; (2) new program . . . from server to apparatus 1; (3) data which was not transmitted in the last operation due to various reasons . . . from apparatus 1 to server; (4) various proceeds information until the power is turned off last time . . . from apparatus 1 to server; (5) operation starting information . . . from the apparatus 1 to server, and the like. In this embodiment, the server generally refers to means having functions as one or both of the network server 5 and management server 9.

As to the data transmission, each of the playing apparatus 1 is provided with an identification number for communication. Said identification number, which is different from an identification (ID) number of the internet 6, signifies "location and function" as a feature concerning marketing. In the present system, said identification number for communication is referred to as "terminal ID", and recorded in the management server 9 and management computer 10.

Figure 4:
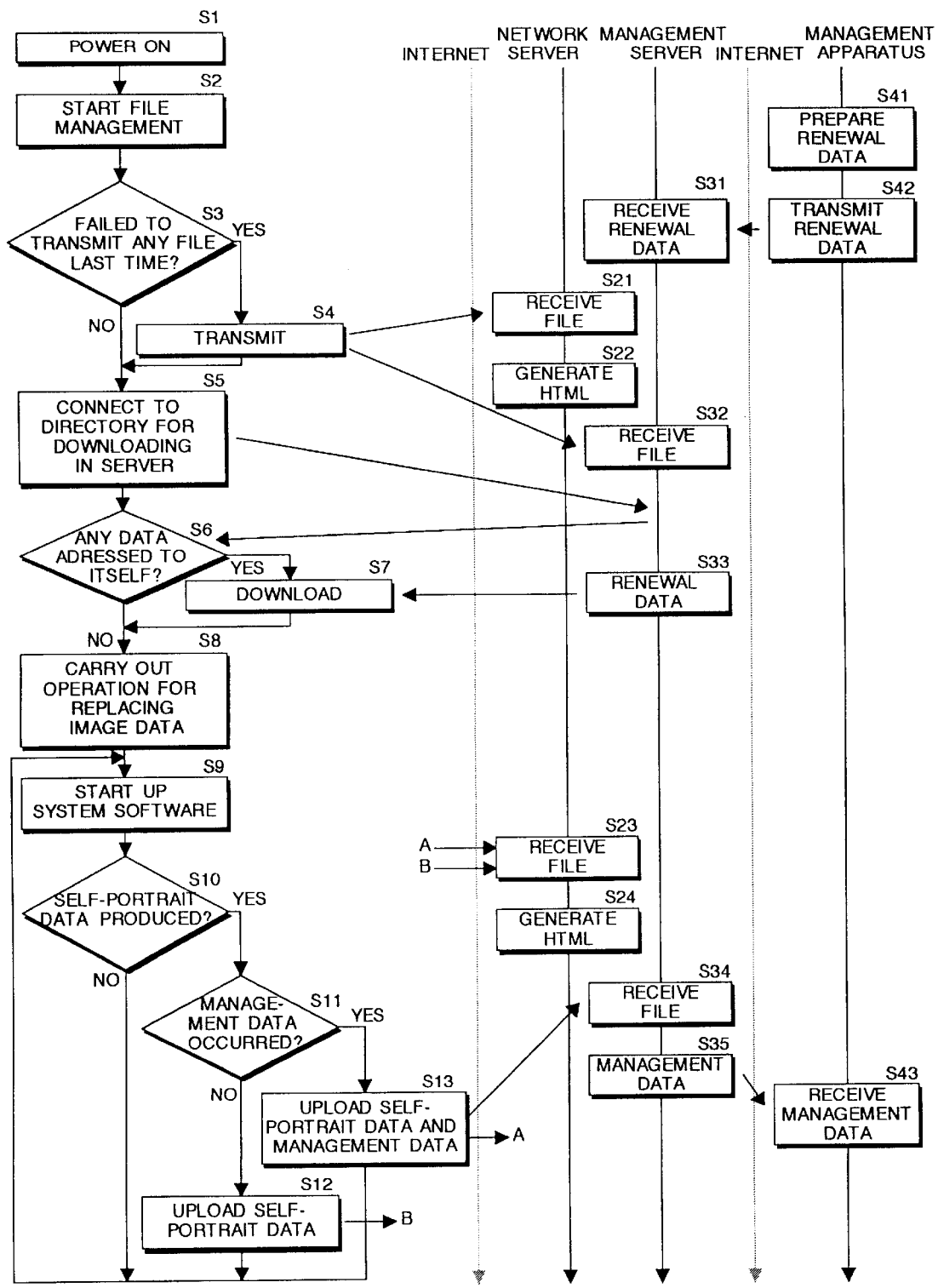
FIG. 4 is a timing sequence of an operation of the picture print playing apparatus according to one embodiment of the present invention.

Next, the operation in the picture print playing apparatus 1 is explained with reference to a timing sequence shown in FIG. 4. The playing apparatus 1 starts up a transmission program at power-on (S1), thereby making connection to the network server 5 through the internet 6. Initially, if any file was failed to be transmitted last time (YES in S3), the file is transmitted to the network server 5 (S4, S21, S22, and S32). After that, the apparatus 1 makes connection to a special directory for downloading in the management server 9 by a transmission program (S5), and opens an index file so as to check whether there is any renewed data (frame picture data of period-limited type) addressed to itself (S6). At that time, if there is any renewed data addressed to the apparatus 1 (S33), the apparatus 1 downloads the renewed data, and stores the frame picture data and playing period data for said frame pictures, respectively into the specified folder 22 and the period-setting folder 21b (S7). Then, after carrying out an operation for replacing the frame picture data (S8), the apparatus 1 starts up a network type playing apparatus (system software) (S9). The operation for replacing the frame picture data will be later described in detail. After that, the apparatus 1 goes into an operational state as a common network type playing apparatus. When a user produces a self-portrait data (YES in S10), the apparatus checks whether management data was generated (S11). If no management data was generated, the apparatus 1 uploads the self-portrait data into the network server 5 (S12, S23 and S24). If management data was generated, the apparatus 1 uploads the self-portrait data and management data into the network server 5 (S13, S34, S35 and S43).

Figure 5:
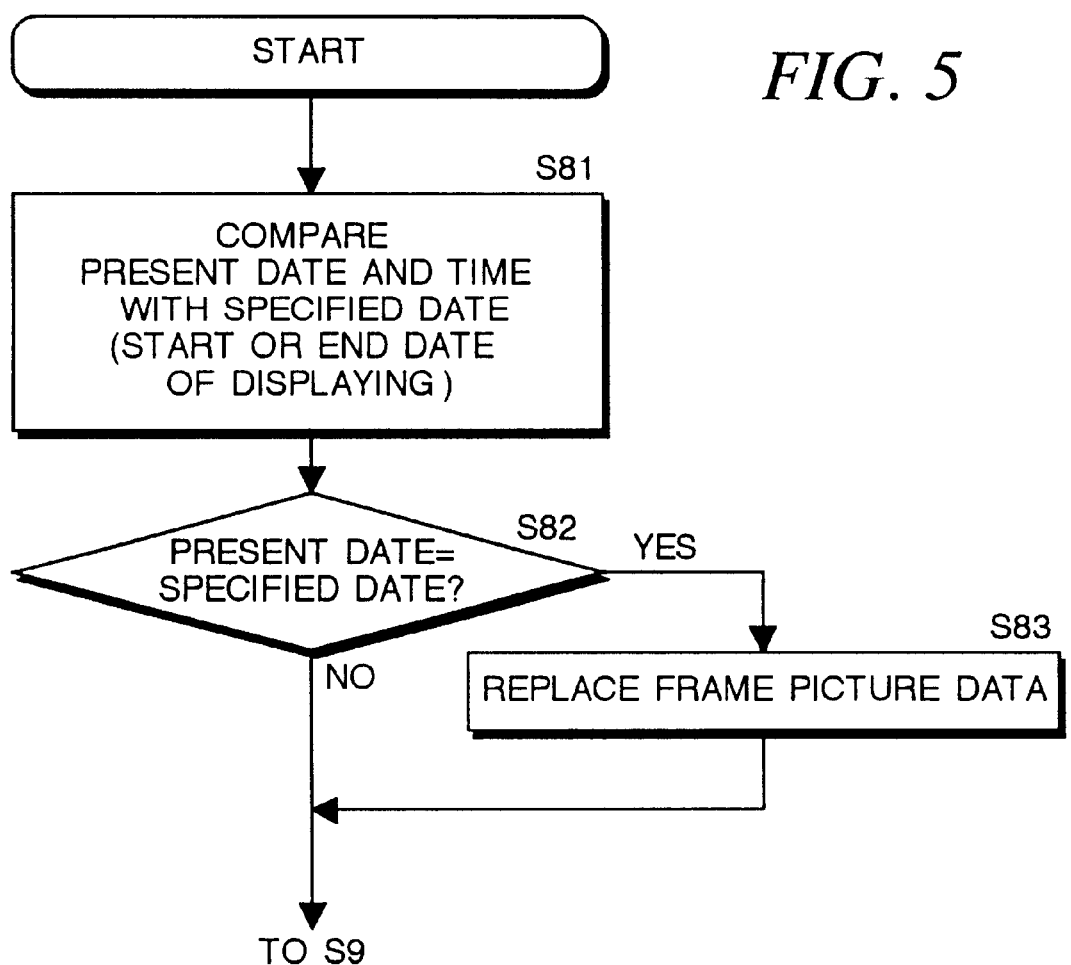
FIG. 5 is a flowchart of an operation for replacing frame picture data.

Next, an operation for replacing the frame picture data of the period-limited type is explained with reference to a flowchart of FIG. 5. The computer 20 reads the period-setting file 21b in the hard disk 21, and compares the present date measured by the timer 31 with the display-start date stored in the playing period data (S81). When the present date agrees with a display-start date (YES in S82), the computer 20 reads out the frame picture data corresponding to the display-start date from the specified file 21, and expands them into the game picture folder 21a so as to replace one of frame picture data which has already been displayed (S83).

Figure 7:
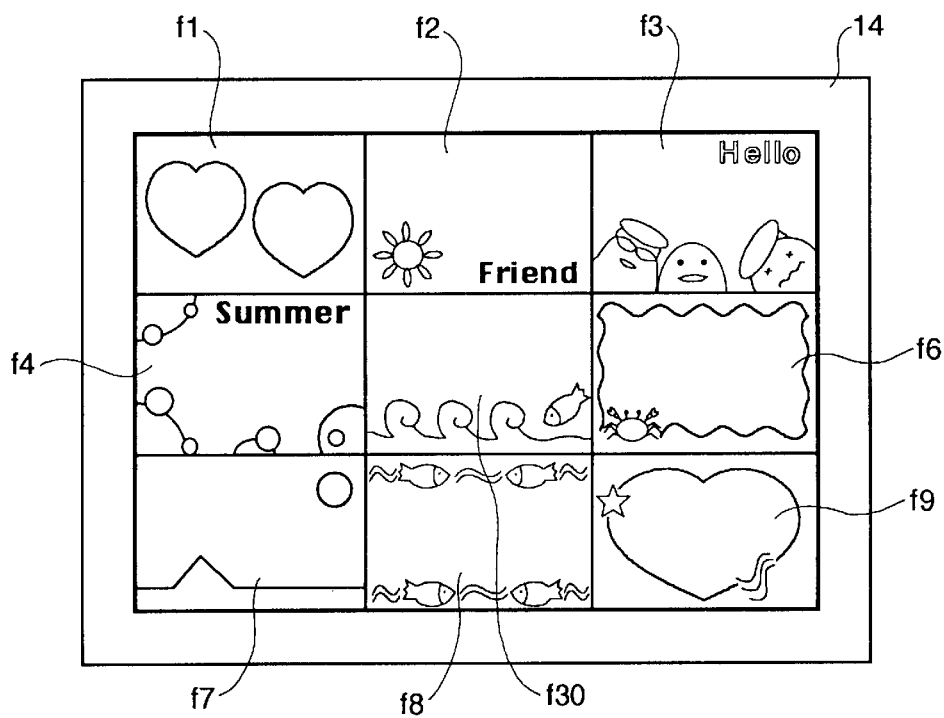
FIG. 7 is a view showing an arrangement of frame pictures on the CRT after replacing the frame picture data.

For example, as shown in FIG. 6, before the operation for replacing the frame picture data, in the hard disk 21 of the apparatus 1, the game picture folder 21a stores nine of frame picture data f1, f2, f3 to f9 in order on the disk 21, and each of nine frame pictures is displayed in each of frames from 1 to 9 on a display 14 of the CRT 24. If the present date agrees with the display-start date of the frame picture data f30 in the period-setting file 21b, and if the frame picture data f5 displayed in the center frame No. 5 on the display 14 of the CRT 24 is designated as a picture to be replaced, it is replaced by frame picture data f30. When this operation is viewed on the CRT 24, the center frame picture f5 shown in FIG. 6 is replaced by the frame picture 30 shown in FIG. 7.

In the operation for replacing frame picture data, when the present date agrees with a display-end date in the period-setting file 21b (YES in S82), the frame picture data is replaced (S83). According to "process after the elapse of display period", the frame picture corresponding to the display-end date is deleted from the CRT 24, or a frame picture which was formerly displayed in the corresponding frame number, or a new frame picture is displayed in the CRT 24. The frame picture having a specified display-end date (the display-end date is stored in the period-setting file 21b) is a frame picture to be replaced, so that, after the display-end date, the former picture which was displayed in the frame is to be displayed. The frame picture which does not have a specified display-end date (display-end date is not stored in the period-setting file 21b) is a frame picture to be overwritten, so that, the former framer which was displayed in the frame is to be deleted.

As described above, in the picture print playing apparatus 1 according to the above embodiment of the present invention, the information such as the start and end date of displaying the frame is stored in the period-setting file 21b, and the frame picture is automatically replaced according to the information, which makes it possible to precisely set the playing period of the frame pictures in each of the apparatuses 1. Further, if the same start and end date of displaying frame pictures are set in plural picture print playing apparatuses 1, playing periods of the frame pictures are unified in these apparatuses, which eliminates the need for simultaneously transmitting the frame picture data from the server 5, and allows the frame pictures to be replaced by a simple constitution. Furthermore, the picture print playing apparatus 1 can be applied for managing the frame pictures having a limited period.

Moreover, it is also possible to make a constitution for storing information such as date and time of starting and ending the displaying of frame pictures instead of the above-mentioned date information of displaying the frame pictures. In such a constitution, when the stored date and time agree with the present date and time which are measured by the timer 31, an operation can be carried out for replacing the frame picture data. In this case, the playing time of the frame pictures can be more strictly limited. For example, this allows a method of determining the playing period of three hours from 4:00p.m. to 7:00p.m.

Having described preferred embodiments of the invention with reference to the accompanying drawings, it is to be understood that the invention is not limited to the above embodiment, and that various changes and modifications may be effected therein by one skilled in the art without departing from the scope or spirit of the invention as defined in the appended claims. For example, although the picture print playing apparatus 1 of the above embodiment is connected to a network, it is also possible to make a constitution in which the playing apparatus is not connected to the network. In this case, a maintenance personnel can previously download the frame picture data to be replaced and playing period data into the hard disk of the apparatus, which eliminates the trouble of bringing new frame pictures and replacing already-displayed frame pictures in the apparatus on the display-start date. Further, if the same time and date of starting the display is set in plural playing apparatuses, the frame pictures are simultaneously changed in these plural apparatuses. Thereby, there is no need for plural maintenance personnel to simultaneously replace the frame pictures on the time and date of starting displaying, which makes it possible to reduce the number of workers.

What is claimed is:

1. A picture print playing apparatus which superimposes a user's subject picture on an elected frame picture so as to produce a self-portrait, and provides a sticker sheet onto which the self-portrait is printed to the user, comprising:

a timer which measures a present date and time;

a memory which stores plural number of frame picture data;

a period-setting file which stores display-start date and time of at least one of frame picture data stored in said memory on the screen;

a processor which compares the present date and time measured by said timer with said display-start date and time stored in said period-setting file, and replaces a frame picture which has been already displayed on the screen with a frame picture corresponding to the display-start date and time when the present date and time agree with the display-start date and time.

2. The picture print playing apparatus according to claim 1, wherein said processor reads said period-setting file at power-on of the picture print playing apparatus, and compares the present date and time with said display-start date and time stored in said period-setting file.

3. The picture print playing apparatus according to claim 1, wherein a memory stores a frame picture which is displayed on the screen at a certain point in the time, and a frame picture which is not yet displayed at that time, but will be displayed when said processor replaces said frame pictures, and wherein said period-setting file contains information for specifying frame pictures to be replaced by said processor.

4. The picture print playing apparatus according to claim 1, wherein said period-setting file further stores display-end date and time, and wherein, when the present date and time agree with the display-end date and time, said processor deletes a frame picture corresponding to said display-end date and time, and replaces said frame picture with another frame picture stored in said memory.

5. The picture print playing apparatus according to claim 4, wherein said processor reads said period-setting file at power-on of the picture print playing apparatus, and compares the present date and time with said display-start date and time and display-end date and time stored in said period-setting file.

6. The picture print playing apparatus according to claim 4, wherein a memory stores a frame picture which is displayed on the screen at a certain point in the time, and a frame picture which is not yet displayed at that time, but will be displayed when said processor replaces said frame pictures, and wherein said period-setting file contains information for specifying frame pictures to be replaced by said processor.

7. The picture print playing apparatus according to claim 6, characterized by being connected to a network server via a telephone line and an internet.

8. The picture print playing apparatus according to claim 7, wherein new frame picture data and playing-period data thereof are transmitted from the server to the picture print playing apparatus, and wherein proceeds information until the power is turned off last time is transmitted at power-on of the picture print playing apparatus from the picture print playing apparatus to the server.

9. A picture print playing system comprising a plurality of the picture print playing apparatuses according to claim 4.

10. The picture print playing system according to claim 9, wherein same display-start date and same display-end date of frame pictures are set in said picture print playing apparatuses.

* * * * *